United States Patent [19]
Yano et al.

[11] Patent Number: 5,939,179
[45] Date of Patent: Aug. 17, 1999

[54] CONSTRAINT TYPE VIBRATION DAMPING MATERIAL

[75] Inventors: Kunihiko Yano, Saitama; Hiroshi Saito, Nara; Takahiro Niwa, Kanagawa, all of Japan

[73] Assignee: Nichias Corporation, Tokyo, Japan

[21] Appl. No.: 08/611,747

[22] Filed: Mar. 6, 1996

[30] Foreign Application Priority Data

Mar. 29, 1995 [JP] Japan .................................. 7-096014

[51] Int. Cl.⁶ .................................................. B32B 15/08
[52] U.S. Cl. .......................... 428/212; 428/448; 428/450; 428/460; 428/463; 428/465
[58] Field of Search .................................. 428/457, 327, 428/458, 465, 212, 448, 450, 421, 463, 460

[56] References Cited

U.S. PATENT DOCUMENTS

| | | | |
|---|---|---|---|
| 3,658,635 | 4/1972 | Eustice | 161/190 |
| 3,833,404 | 9/1974 | Sperling et al. | 117/63 |
| 4,204,022 | 5/1980 | Snyder et al. | 428/337 |
| 4,766,028 | 8/1988 | Rich | 428/253 |
| 4,806,437 | 2/1989 | Yokoi et al. | 428/623 |
| 5,099,962 | 3/1992 | Furusu et al. | 188/73.37 |
| 5,118,562 | 6/1992 | Johnson et al. | 428/327 |
| 5,262,232 | 11/1993 | Wilfong et al. | 428/327 |
| 5,271,612 | 12/1993 | Yada et al. | 267/158 |
| 5,289,904 | 3/1994 | Harrison | 188/73.1 |
| 5,300,355 | 4/1994 | Mifune et al. | 428/215 |
| 5,464,659 | 11/1995 | Melancon et al. | 427/387 |
| 5,474,840 | 12/1995 | Landin | 428/294 |
| 5,516,587 | 5/1996 | Tanaka | 428/460 |
| 5,695,867 | 12/1997 | Saitoh | 428/219 |
| 5,712,038 | 1/1998 | Yamazaki | 428/411.1 |

FOREIGN PATENT DOCUMENTS

| | | |
|---|---|---|
| 0 335 642 | 10/1989 | European Pat. Off. . |
| 0 510 974 | 10/1992 | European Pat. Off. . |
| 0 540 332 | 5/1993 | European Pat. Off. . |
| 0 642 920 | 3/1995 | European Pat. Off. . |
| 06-081959 | 3/1994 | Japan . |
| 06/081956 | 3/1994 | Japan . |
| 92/19398 | 11/1992 | WIPO . |

*Primary Examiner*—D. S. Nakarani
*Attorney, Agent, or Firm*—Flynn, Thiel, Boutell & Tanis, P.C.

[57] ABSTRACT

A constraint type vibration damping material, which exhibits a high vibration damping performance and can realize easiness of processing and a low cost at the same time, is provided, in which a polymer viscoelastic layer made of rubber, etc. is formed on at least one surface of a rigid body such as a metal plate, etc. and a hard cover layer having a rigidity modulus greater than that of the viscoelastic layer and smaller than that of the rigid body. Since the hard cover layer having a great rigidity modulus acts as a constraining material, which forms as the result a pair with the rigid body. Further, since the polymer viscoelastic layer and the hard cover layer can be formed by continuous fabrication steps, it can be advantageous from the point of view of the cost.

5 Claims, 5 Drawing Sheets

CONSTRAINT TYPE VIBRATION DAMPING MATERIAL

FIELD OF THE INVENTION

The present invention relates to a constraint type vibration damping material consisting of a rigid body such as a metal plate and a polymer viscoelastic body having a good vibration absorbing property, and in particular to an improvement of the constraint type vibration damping material suitable for use as shim for preventing brake squeal in an automobile or a facing plate for a building.

DESCRIPTION OF THE PRIOR ART

Figure 14:
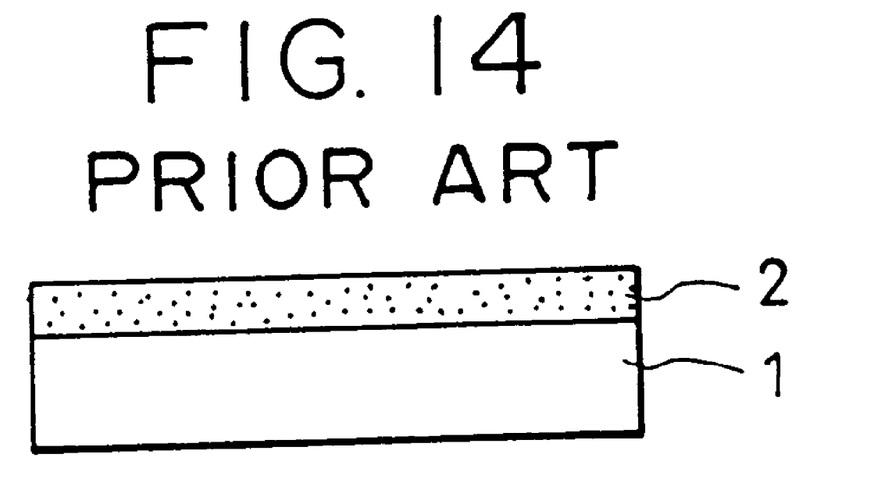
FIG. 14 is a schematical diagram showing the construction of a prior art non-constraint type vibration damping material.
Figure 15:
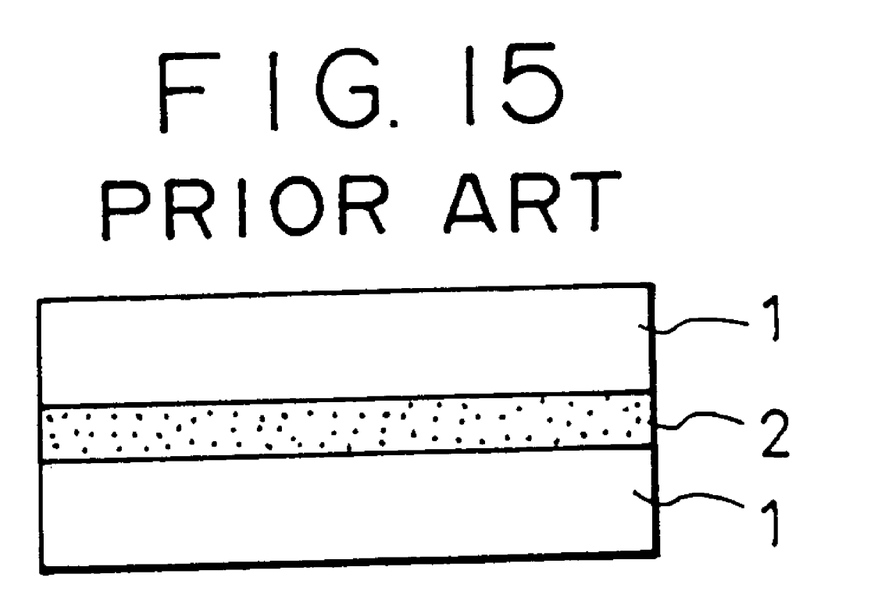
FIG. 15 is a schematical diagram showing the construction of a prior art constraint type vibration damping material.

Heretofore, as composite vibration damping materials formed by combining metal plates and polymer viscoelastic layers there are known vibration damping materials having a structure, in which a (or two) polymer viscoelastic layer(s) 2 made of rubber or synthetic resin is (or are) superposed on one (or two) surface(s) of a thin metal plate 1, as indicated in FIG. 14, or a structure, in which a polymer viscoelastic layer 2 is provided between two metal plates 1 in the form of a sandwich, as indicated in FIG. 15.

The vibration damping material indicated in FIG. 14 is called "a non-constraint type", in which vibration is absorbed by "expansion and contraction deformation" of the polymer viscoelastic layer due to bending vibration, while the vibration damping material indicated in FIG. 15 is called "a constraint type", in which vibration is absorbed by "shearing deformation" of the polymer viscoelastic layer due to bending vibration.

As explained above, there are basically two kinds of structures of non-constraint type and constraint type in composite vibration damping materials, either of which has advantages and disadvantages.

For example, following vibration damping structures are used for conventional shim for preventing brake squeal in an automobile, each of which has advantages and disadvantages.

a) Rubber coat metal type . . . in which the two surfaces of a metal plate are coated with rubber and which is used, fixed by spring-like nails on a brake pad. Vibration is absorbed by viscoelasticity of the rubber, which alleviates brake squeal.

Advantage . . . low cost (both in raw material and in mounting work).

Disadvantage . . . low vibration absorbing capacity because of the non-constraint type (in which vibration is absorbed by expansion and contraction deformation of rubber).

b) Vibration damping steel plate type . . . in which a viscoelastic layer is provided between two metal plates and which is used, fixed by spring-like nails, just as the rubber coat metal described previously. Vibration is absorbed by the viscoelastic layer, which prevents squeal.

Advantages . . . it exhibits a higher vibration absorbing capacity with respect to the non-constrained type owing to its constraint type damping structure (shearing deformation of the viscoelastic layer).

Since surfaces thereof are metallic, it is hardly damaged by piston pressure.

Disadvantages . . . raw materials are expensive. It is difficult to perform processing (nail bending, etc.) and it can be pealed off.

c) Apart therefrom, there are "a type stuck by using adhesive", "a type, in which damping steel plates are stuck by using thermosetting resin", etc. Although all of them have the constraint type vibration damping structure and a high squeal preventing effect, they are further more expensive both in raw material and in adhering work.

Further, following vibration damping structures are used for conventional sound isolation facing plates, each of which has advantages and disadvantages.

a) Damping steel plate type . . . in which a viscoelastic layer is provided between two metal plates and vibration is absorbed by the viscoelastic layer, generation of noise being thus suppressed.

Advantages . . . it exhibits a high vibration absorbing effect owing to its constraint type vibration damping structure (shearing deformation of the viscoelastic body). Since the viscoelastic layer is in the interior, it is hardly influenced by environment and excellent in durability.

Disadvantages . . . raw materials therefor are expensive.

In general, it is difficult to perform bending work, etc. If interlayer adhering strength is low, pealing can take place.

b) Damping paint type . . . in which paint, etc. having a vibration damping property is applied mainly on the building site to one surface (on the inner side).

Advantages . . . bending work, etc. can be easily performed owing to its non-constraint type structure. Raw material cost is low.

Disadvantages . . . the vibration absorbing property is worse because of it non-constraint type damping structure (vibration is absorbed by expansion and contraction deformation). Application cost is high. It has a bad stability in quality and it is easily influenced by environment.

As described above, the performance and the cost of the prior art shim for preventing brake squeal and sound isolation facing plates using vibration damping materials conflict in many points with each other, which gives rise to a great hindrance in practice.

Generally vibration damping performance as the vibration damping material can be improved remarkably by adopting the constraint type vibration damping structure. As described above, the constraint type vibration damping structure is one, in which a polymer viscoelastic body is provided (constrained) between two metal plates, etc. having a high rigidity and vibration energy is transformed into thermal energy at vibration by the shearing deformation of the polymer viscoelastic body, which attenuates the vibration as the result. Therefore this type of vibration damping structure exhibits a performance almost equal to that of the non-constraint type (in which a viscoelastic body is stuck only to one surface of a vibrating body) with a thickness of the polymer viscoelastic body ⅕ time as small as that of the latter.

Consequently it can be said, in order to improve vibration damping performance, it is preferable to adopt the constraint type vibration damping structure rather than the non-constraint type and a number of this kinds of products, represented by the vibration damping steel plate, are put on the market.

However, for the constraint type (specifically the vibration damping steel plate), since two constraining plates (metal plates, etc) are adhered through a polymer viscoelastic body, there are disadvantages that easiness of processing such as bending, dishing, etc. is bad, that even if the processing can be executed, its damping performance decreases because of internal peeling, that raw material and work cost is considerably high, etc., which gives rise to an obstacle against wide utilization thereof.

OBJECT OF THE INVENTION

The principal object of the present invention is to provide a constraint type vibration damping material capable of exhibiting a high vibration damping performance for use in a wide technical field including prevention of brake squeal, sound isolation facing plates and realizing an easiness of processing and a low cost at the same time.

SUMMARY OF THE INVENTION

A constraint type damping material according to the present invention is characterized in that, on at least one surface of a rigid body, a polymer viscoelastic layer and a hard cover layer having a modulus of rigidity which is smaller than that of the rigid body and greater than that of the polymer viscoelastic layer, are formed one after another.

For the rigid body a high rigidity plate can be used, which is a metal plate made of iron, aluminium, stainless steel, copper, etc.; an inorganic board such as a calcium silicate plate, a gyps board; and a thermosetting resin plate made of phenol resin, polyimide resin, etc.

For the polymer viscoelastic layer formed on the surface of the rigid body raw materials having high vibration loss coefficients can be used, which are synthetic rubbers such as natural rubber, NBR, SBR, butyl rubber, acryl rubber, silicone rubber, fluorine rubber, etc.; and thermosetting resins such as polyethylene resin, polyamide resin, etc.

For the hard cover layer formed on the polymer viscoelastic layer, polymer resins of thermosetting type such as phenol resin, urea resin, or polymer resins hardened by ultraviolet ray, etc. as well as metal compound cover layers of molybdenum bisulfide, molybdenum dioxide, etc. can be used. They can be arbitrarily selected according to object of utilization or required characteristics just as the polymer viscoelastic layer.

It is preferable to select the rigid body, the polymer elastic layer and the hard cover layer as indicated in TABLE 1. Among them there should be a relation of RIGID BODY > HARD COVER LAYER > POLYMER VISCOELASTIC LAYER.

In case where the rigidity of these constituent materials varies, dependent on the temperature, similar effects can be obtained, if the relation is valid in a temperature domain, where they are used.

TABLE 1

| RIGIDITY/<br>RAW MATERIAL | MODULUS OF<br>RIGIDITY (N/m$^2$) | PREFERABLE<br>MODULUS OF<br>RIGIDITY (N/m$^2$) |
|---|---|---|
| RIGID BODY<br>(IRON PLATE, ETC.) | $1 \times 10^8$ to $2 \times 10^{11}$ | $1 \times 10^8$ to $2 \times 10^{11}$ |
| POLYMER VISCOELASTIC<br>LAYER (RUBBER, ETC.) | $1 \times 10^3$ to $1 \times 10^9$ | $1 \times 10^5$ to $1 \times 10^8$ |
| HARD COVER LAYER<br>(THERMOSETTING<br>RESIN, ETC.) | $1 \times 10^7$ to $1 \times 10^{10}$ | $1 \times 10^8$ to $1 \times 10^9$ |

The vibration damping material can be easily fabricated by a following concrete method. For example, one (or two) surface(s) of a metal plate is (are) coated with rubber dissolved in a solvent. After vulcanization, the surface of this rubber layer is coated with a thermosetting resin layer having a modulus of rigidity, which is greater than that of the rubber layer and smaller than that of the metal layer. Thereafter the resin layer is hardened by heating it.

In this case, it can be fabricated in continuous fabrication steps. In particular, since a conventional coating step can be used for both the coating steps for the polymer viscoelastic layer and the hard cover layer, this method is advantageous also from the point of view of the cost.

In a practical application, e.g. for a brake shim, a thermosetting polymer resin having a high rigidity may be selected, which has a resistance against compression and rigidity so high that the resin layer can resist attack by a brake piston as well as a high heat resistance.

In case where the sliding property has influences on the brake squeal, it is possible to realize an alleviation of vibration generating force and a high vibration damping effect by the constraint type vibration damping structure at the same time by selecting a thermosetting polymer resin having a high sliding property or by coating the surface thereof with a cover layer made of molybdenum bisulfide having a higher sliding property.

On the other hand, for facing plates for a building, it can be realized by using a surface decorating metal plate for the metal layer and by selecting a thermosetting polymer resin, which can follow bending or dishing processing, for the resin layer having a high rigidity.

These are strictly only examples and since a constraint type vibration damping structure can be easily realized by selecting constituent raw materials according to the object, it can be applied to all the fields, where it was heretofore not able to be used because of bottle-necks such as high cost, difficulty of processing, etc. It can be said that this is another advantage of the present invention.

By the vibration damping material thus constructed, since the cover layer, which is formed on the surface of the polymer viscoelastic layer on the rigid body and has a high rigidity, acts as a constraining material forming a pair with the rigid body, without adhering another rigid body such as a metal plate, etc. as a constraining plate, it is possible to obtain a constraint type vibration damping structure as the result having a high vibration damping performance.

In case where rubber, etc. having a specifically small modulus of rigidity is selected for the polymer viscoelastic layer, since rubber itself is isotropic, it is easily deformed in any direction. Nevertheless, since flow of the rubber from the end portion can be suppressed against compressive force owing to the presence of the hard cover layer, apparent elastic modulus is increased and as the result compression resisting force can be reinforced. Further, since no constraining force acts in the shearing direction, it is possible to realize an anisotropy so that the elastic modulus of rubber can be exhibited as it is.

This is efficient for alleviating the vibration generating force caused by a stick slip phenomenon accompanied by the rotating force of a rotor in the shearing direction, when a high strength is needed against the compressive force, which is effective a shim for preventing the squeal.

From the point of view of the cost, the rubber coat metal type can be fabricated in same fabrication steps. Therefore, although the raw material cost used for the hard cover layer is raised up, since the thickness of the polymer viscoelastic layer can be decreased by adopting the constraint structure, it can be fabricated at an almost same cost.

For the vibration damping steel plate, since the adhering step on the metal plate is unnecessary, cost can be decreased considerably.

Further, in either case, since not only the vibration damping property but also easiness of processing and durability can be improved, also from the collective point of view it is possible to obtain a remarkable cost lowering effect.

DESCRIPTION OF THE PREFERRED EMBODIMENTS

Hereinbelow various embodiments of the present invention will be explained in detail, together with several compared examples, referring to the drawings.

EMBODIMENT (1)

Figure 1:
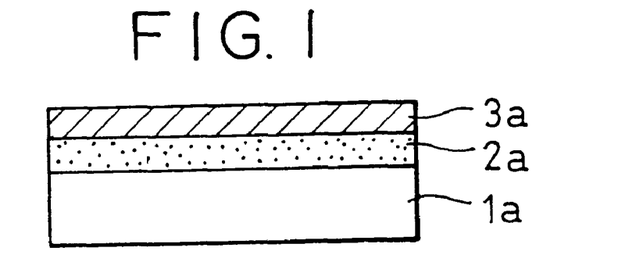
FIG. 1 is a schematical diagram showing the construction of the vibration damping material according to an embodiment of the present invention.

As indicated in FIG. 1, in the present embodiment, a surface of a rubber coat metal (RCM) made by coating one surface of a metal plate 1a, which is a cold pressed steel plate (SPCC), with a rubber layer 2a of NBR is coated with a phenol resin layer 3a having a rigidity greater than that of the rubber layer, the phenol resin layer 3a being hardened by thermal processing to obtain a hard cover layer.

The RCM is a plate having an overall thickness of 0.52 mm widely used usually as brake shim material, in which one surface of a cold pressed steel plate (SPCC) 0.4 mm thick is coated with NBR dissolved in a solvent in a thickness of 0.12 mm which is thereafter dried and vulcanized. Subsequently the surface of the rubber layer is coated with solution-like phenol resin, which is dried and hardened in an oven for heat treatment to form a resin layer 0.15 mm thick, in order to obtain a vibration damping material.

Further, the vulcanization of rubber and the hardening processing can be effected simultaneously by coating the surface of the rubber layer with phenol resin in the course of the fabrication of the RCM (in a state where the rubber is not yet vulcanized). In this way it is possible to intend increase in adhering force between the rubber layer and the phenol resin layer as well as decrease in the number of fabrication steps and cost reduction.

EMBODIMENT (2)

Figure 2:
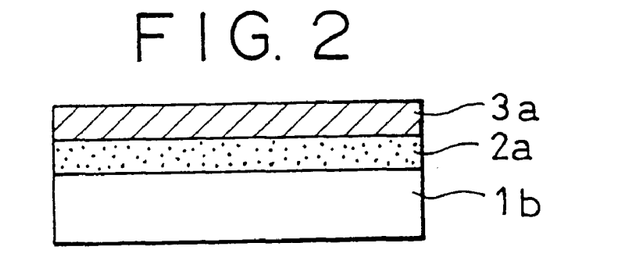
FIG. 2 is a schematical diagram showing the construction of the vibration damping material according to another embodiment of the present invention.

As indicated in FIG. 2, in the present embodiment, a colored steel plate 1b having a decorative layer is used as the metal plate. One surface thereof is coated with a rubber layer 2a, which is dried and subjected to vulcanization processing. The surface of the rubber layer is coated with a phenol resin layer 3a, which is hardened by thermal processing to obtain a hard cover layer.

A colored plate is used usually as a facing plate and here a plate 0.27 mm thick is used, which is coated with rubber so that a layer 0.12 mm thick is obtained after vulcanization. Thereafter the surface of the rubber layer is coated with solution-like phenol thermosetting resin, which is dried and hardened in an oven for heat treatment to form a resin layer 0.5 mm thick, in order to a vibration damping material.

EMBODIMENT (3)

Figure 3:
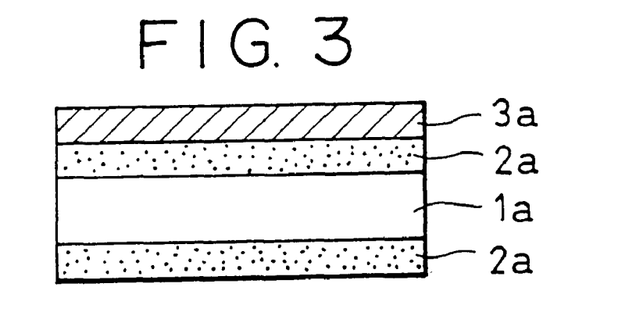
FIG. 3 is a schematical diagram showing the construction of the vibration damping material according to still another embodiment of the present invention.

As indicated in FIG. 3, in the present embodiment, the two surfaces of a metal plate 1a are coated with rubber layers 2a of NBR in a thickness of 0.12 mm and the surface of one of the rubber layers 2a is coated with a phenol resin layer 3a in a thickness of 0.15 mm.

EMBODIMENT (4)

Figure 4:
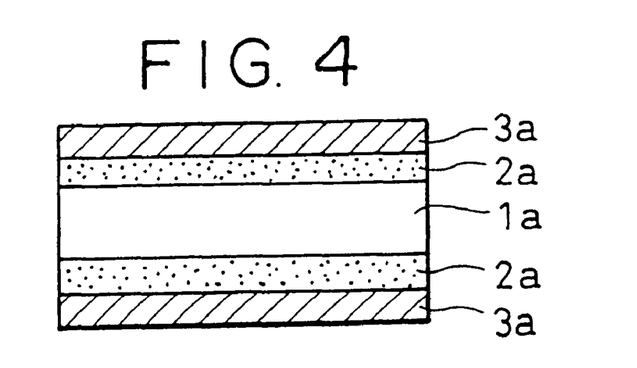
FIG. 4 is a schematical diagram showing the construction of the vibration damping material according to still another embodiment of the present invention.

As indicated in FIG. 4, in the present embodiment, the two surfaces of a metal plate 1a are coated rubber layers 2a of NBR in a thickness of 0.12 mm and the two outer surfaces of the rubber layers is coated with phenol resin layers 3a in a thickness of 0.15 mm.

EMBODIMENT (5)

Figure 5:
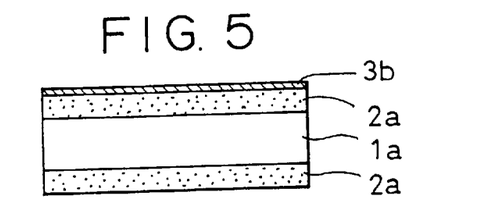
FIG. 5 is a schematical diagram showing the construction of the vibration damping material according to still another embodiment of the present invention.

As indicated in FIG. 5, in the present embodiment, the two surfaces of a metal plate 1a are coated with rubber layers 2a of NBR in a thickness of 0.12 mm and after vulcanization of the rubber the surface of one of the rubber layers is coated with a molybdenum bisulfide layer 3b in a thickness of 0.05 mm.

EMBODIMENT (6)

Figure 6:
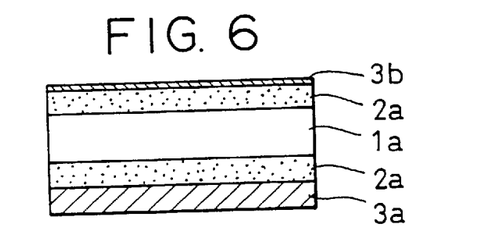
FIG. 6 is a schematical diagram showing the construction of the vibration damping material according to still another embodiment of the present invention.

As indicated in FIG. 6, in the present embodiment, the two surfaces of a metal plate 1a are coated with rubber layers 2a of NBR in a thickness of 0.12 mm and the surface of one of the rubber layers 2a is coated with a phenol resin layer 3a in a thickness of 0.15 mm, while the surface of the other rubber layer 2a is coated with a molybdenum bisulfide layer 3b in a thickness of 0.05 mm.

EMBODIMENT (7)

Figure 7:
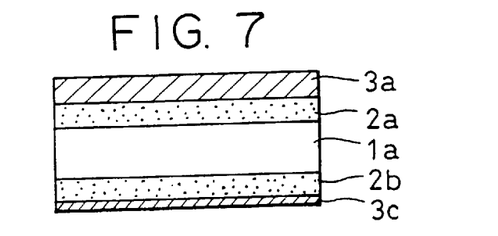
FIG. 7 is a schematical diagram showing the construction of the vibration damping material according to still another embodiment of the present invention.

As indicated in FIG. 7, in the present embodiment, one surface of a metal plate 1a is coated with a rubber layer 2a of NBR in a thickness of 0.12 mm, while the other surface of the metal plate is coated with an acryl rubber layer 2b in a thickness of 0.12 mm. The surface of the rubber layer 2a is coated with a phenol resin layer 3a to obtain a hard cover layer. Further the surface of the rubber layer 2b is coated with a polyimide resin layer 3c to obtain another hard cover layer.

COMPARED EXAMPLE (1)

Figure 8:
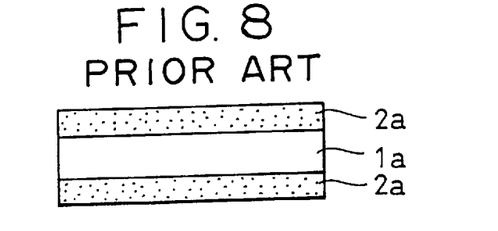
Fig. 8 is a schematical diagram showing the construction of a prior art vibration damping material.

As indicated in FIG. 8, in the present prior art example, the two surfaces of a metal plate 1a are coated with rubber layers 2a. This is widely used usually as a brake shim material and its overall thickness is 0.64 mm.

COMPARED EXAMPLE (2)

Figure 9:
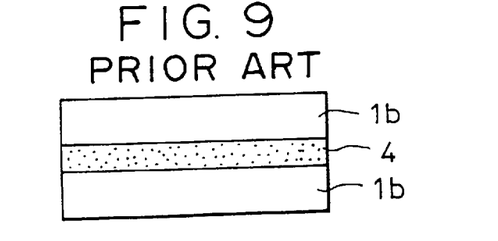
FIG. 9 is a schematical diagram showing the construction of another prior art vibration damping material.

As indicated in FIG. 9, in the present prior art example, color steel plates 1b, each of which has a decorative layer, are used as metal plates and a vibration damping steel plate is formed by putting a thermoplastic resin film 4 generally used between the two steel plates by adhesion. Here a polyethylene resin film 65 μm thick is used for the thermoplastic resin film and the color steel plates used are 0.27 mm thick. It is fabricated by fixing the polyethylene resin film on the first color steel plate in a state where a tensile force is applied thereto so that no wrinkles are produced and after having superposed the second plate thereon by adhering them to each other by applying heat and pressure thereto by hot press.

COMPARED EXAMPLE (3)

Figure 10:
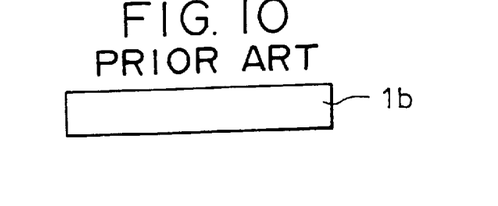
FIG. 10 is a schematical diagram showing the construction of still another prior art vibration damping material.

A prior art color steel plate 1b 0.27 mm thick having a decorative layer corresponding to JIS G3312 as indicated in FIG. 10 is used.

Figure 11:
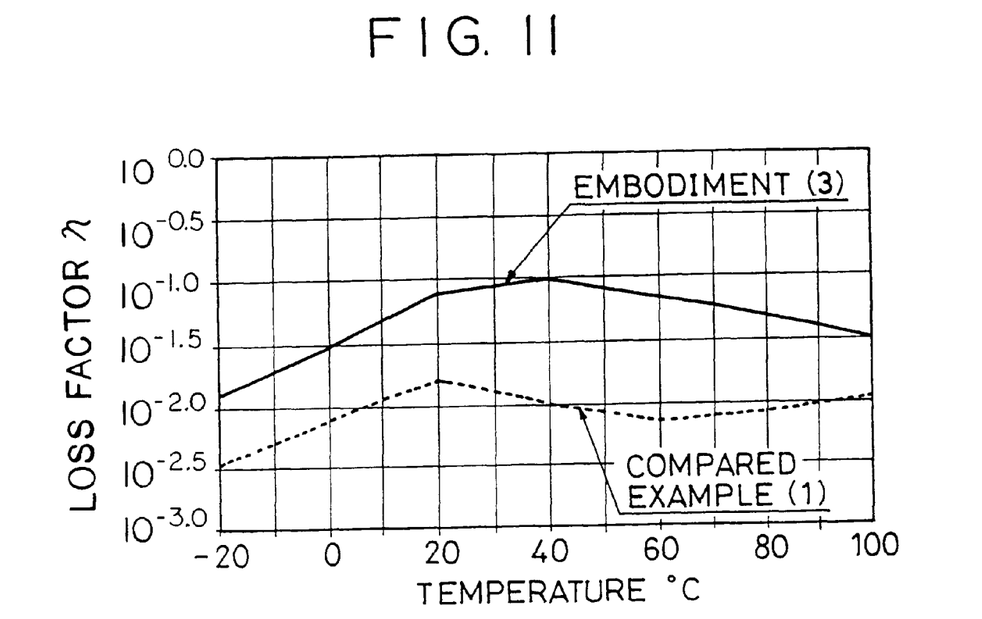
FIG. 11 is a graph indicating vibration damping characteristics of several vibration damping materials.

The graph indicated in FIG. 11 shows vibration damping characteristics of EMBODIMENT (3) in comparison with COMPARED EXAMPLE (1)the prior art assembly of FIG. 8.

The loss factor η is used as an index showing speed of vibration attenuation and vibration damping characteristics are evaluated by investigating its dependence on measurement temperature and its height in the level. The loss factor is measured by the mechanical impedance method. Temperature T of FIG. 11 is the temperature of the assembly at which its vibration damping loss factor was measured.

As indicated in the graph, it can be admitted that the damping characteristics are significantly improved with respect to the prior art vibration damping material by using the vibration damping material according to EMBODIMENT (3), in which the surface of the rubber layer is coated with the thermosetting resin layer. This is because the thermosetting resin layer acts as a constraining layer. For this reason it is possible to obtain a high vibration damping performance at a same cost as a prior art RCM.

Figure 12:
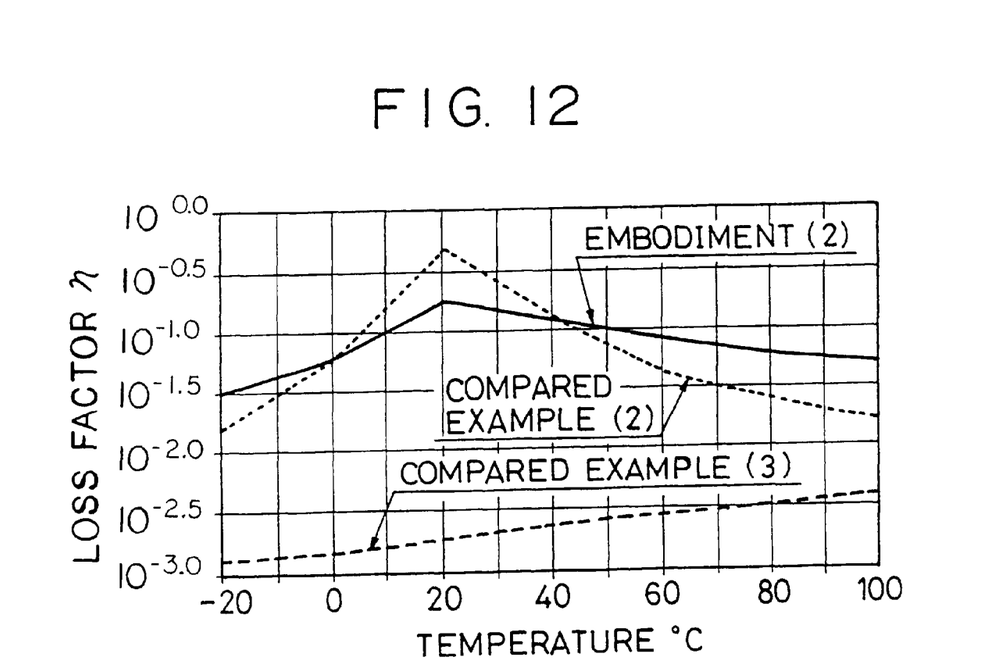
FIG. 12 is a graph indicating vibration damping characteristics of other vibration damping materials.

The graph indicated in FIG. 12 shows vibration damping characteristics of EMBODIMENT (2) in comparison with COMPARED EXAMPLES (2) and (3) the prior art assemblies of FIGS. 9 and 10, respectively.

As it can be seen from this graph, it can be admitted that the vibration damping characteristics are significantly improved with respect to a usual color steel plate and that although the peak level is somewhat lower than that of the vibration damping steel plate, it has a small temperature dependency and it can be used in a wide temperature domain.

Figure 13:
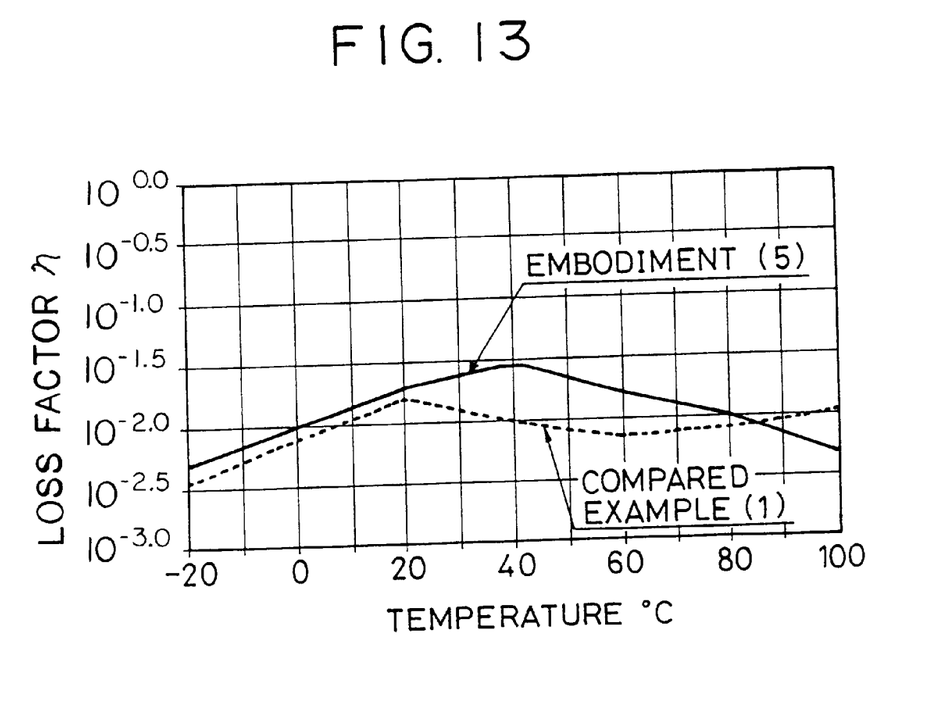
FIG. 13 is a graph indicating vibration damping characteristics of still other vibration damping materials.

The graph indicated in FIG. 13 shows vibration damping characteristics of EMBODIMENT (5) in comparison with COMPARED EXAMPLE (1). TABLE 2 shows superficial properties of matter of EMBODIMENT (5) in comparison with COMPARED EXAMPLE (1) the prior art assembly of FIG. 8.

TABLE 2

| EMBODIMENT (5) | PENCIL HARDNESS OF PHENOL RESIN LAYER 2a IN FIG. 5 | STATIC FRICTION COEFFICIENT OF A PHENOL RESIN LAYER 2a IN FIG. 5 |
|---|---|---|
| | STAND 3H to 4H | 0.1 to 0.2 |
| COMPARED EXAMPLE (1) | PENCIL HARDNESS OF A PHENOL RESIN LAYER 2a IN FIG. 8 | STATIC FRICTION COEFFICIENT OF A PHENOL RESIN LAYER 2a IN FIG. 8 |
| | STAND HB TO H | 0.3 to 0.5 |

As indicated in TABLE 2, according to EMBODIMENT (5), since it is possible to realize not only improvement of the vibration damping characteristics but also increase in superficial hardness and decease in friction coefficient at the same time, the vibration damping material is resistant specifically to compressive force of the brake piston for the disk brake of an automobile. Apart therefrom it is confirmed that it has a number of satisfactory characteristics that it gives rise hardly to stick slip, which causes presumably vibration generation, because it slides easily, etc.

As explained in detail in the above, the vibration damping material according to the present invention has following effects.

(1) Since it is resistant to compressive force and there is no bulging out of the polymer viscoelastic layer, etc., it stands a severe environment of use.

(2) Since it is so constructed that a usual polymer viscoelastic layer is provided between a rigid body such as a metal plate, etc. and a hard cover layer having a rigidity, a high vibration damping effect due to shearing deformation can be obtained.

(3) Processing can be effected for the vibration damping material using a hard cover layer having a high rigidity, while for a usual constraint type vibration damping material (in which a polymer viscoelastic layer is between two metal plates), since the two metal plates acting as rigid bodies push each other, processing such as bending, dishing, etc. can be hardly effected.

(4) Since particularly a vibration damping material having a hard cover layer made of molybdenum bisulfide can realize improvement of the vibration damping characteristics, increase in superficial hardness of the vibration damping material, and decrease in friction coefficient at the same time, it resistant to compressive force of the brake piston and further it has a number of satisfactory characteristics at the same time that it gives rise hardly to stick slip, which causes presumably vibration generation, because it slides easily, etc.

(5) The polymer viscoelastic layer and the hard cover layer can be formed on the surface of the rigid body by continuous fabrication steps, it can be advantageous also from the point of view of the cost.

What is claimed is:

1. A constraint layer vibration damping structure consisting of three distinct layers, wherein: a first layer is a first rigid member formed from a cold press steel plate; a second layer is a polymer viscoelastic layer comprising a rubber layer which is directly coated on said steel plate by a coating process; a third layer is a hard cover layer made of a polymer resin hardened by heating or ultraviolet radiation and directly coated on said rubber layer and that has a modulus of rigidity less than the modulus of rigidity of said first rigid member and greater than the modulus of rigidity of said polymer viscoelastic layer; and the modulus of rigidity of said first rigid member is between $1 \times 10^8$ and $2 \times 10^{11} N/m^2$, the modulus of rigidity of said polymer viscoelastic layer is between $1 \times 10^3$ and $1 \times 10^4 N/m^2$ and the modulus of rigidity of said hard cover layer is between $1 \times 10^7$ and $2 \times 10^8 N/m^2$, whereby said hard cover layer, in combination with said steel plate, act as constraining material on said viscoelastic layer.

2. The constraint layer vibration damping structure of claim 1, wherein the polymer resin forming said hard cover layer is a phenol resin.

3. A constraint layer vibration damping structure formed from five layers of materials comprising: a first rigid member; first and second polymer viscoelastic layers directly coated, respectively, on front and rear surfaces of said first rigid member by a coating process; second and third rigid members directly coated, respectively, on said first and second polymer viscoelastic layers, the improvement wherein said second and third rigid members are hard cover layers formed from polymer resin hardened by heating or ultraviolet radiation wherein the polymer resin from which said hard cover layers is formed is different from the material forming said first rigid member; said first and second polymer viscoelastic layers are formed from rubber and each said hard cover layer has a modulus of rigidity less than the modulus of rigidity of said first rigid member and greater than the modulus of rigidity of said polymer viscoelastic layers whereby said hard cover layers, in combination with said first rigid member, act as constraining materials on said viscoelastic layers.

4. The constraint layer vibration damping structure of claim 3, wherein the polymer resin forming said hard cover layers is a phenol resin.

5. A constraint layer vibration damping structure comprising a rubber coated metal consisting of a metal plate on which a rubber layer is directly coated by a coating process, and a hard cover layer directly coated on said rubber layer by a coating process, the improvement wherein said hard cover layer is a phenol resin layer hardened by thermal processing and said hard cover layer in combination with said metal plate act as constraining material on said rubber layer.

* * * * *